US012726143B2

(12) United States Patent
Millett et al.

(10) Patent No.: US 12,726,143 B2
(45) Date of Patent: Sep. 1, 2026

(54) ELEVATOR MACHINE BRAKING

(71) Applicant: OTIS ELEVATOR COMPANY, Farmington, CT (US)

(72) Inventors: Steven Michael Millett, Plainville, CT (US); Prasanna Nagarajan, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 861 days.

(21) Appl. No.: 18/166,513

(22) Filed: Feb. 9, 2023

(65) Prior Publication Data

US 2024/0275314 A1 Aug. 15, 2024

(51) Int. Cl.
*H02P 3/22* (2006.01)
*B66B 1/06* (2006.01)
*B66B 11/04* (2006.01)

(52) U.S. Cl.
CPC .................. *H02P 3/22* (2013.01); *B66B 1/06* (2013.01); *B66B 11/043* (2013.01)

(58) Field of Classification Search
CPC . H02P 3/22; B66B 1/06; B66B 11/043; B66B 1/308; B66B 1/30; B66B 1/34; B66B 5/145; B66D 5/30; B66D 5/14
See application file for complete search history.

(56) References Cited

U.S. PATENT DOCUMENTS 5,698,823 A 12/1997 Tanahashi
6,573,681 B2 6/2003 Schwesig
6,927,988 B2 8/2005 Cheng et al.
7,116,066 B2 10/2006 Lin
8,890,448 B2 11/2014 Putkinen et al.
9,434,575 B2 9/2016 Kattainen et al.
9,776,829 B2 * 10/2017 Kattainen ............... B66B 13/22
9,975,729 B2 5/2018 Rogers et al.
10,899,579 B2 1/2021 Nakari
11,008,197 B2 5/2021 Nikander et al.
11,563,398 B1 * 1/2023 Naik ........................ H02M 1/36
11,661,313 B2 5/2023 Raassina et al.
(Continued)

FOREIGN PATENT DOCUMENTS

CN 1972855 A 5/2007
CN 102234045 B 5/2013
(Continued)

*Primary Examiner* — Bickey Dhakal

(74) *Attorney, Agent, or Firm* — Carlson, Gaskey & Olds, P.C.

(57) ABSTRACT

An elevator drive configured to control power to an elevator motor includes a plurality of first (upper) inverter switches and a plurality of second (lower) inverter switches. A processor is configured to provide control signals to control operation of the inverter switches. A first signal buffer between the processor and the inverter switches is configured to selectively prevent any control signals from turning on any of the inverter switches when the motor should not receive power. A second signal buffer between the processor and the inverter switches is configured to selectively bypass the first signal buffer, prevent any control signals from turning on the first inverter switches, and allow a control signal from the processor to turn on the second inverter switches to provide motor braking.

24 Claims, 4 Drawing Sheets

(56) References Cited

U.S. PATENT DOCUMENTS

| | | | | |
|---|---|---|---|---|
| 2012/0217098 | A1* | 8/2012 | Putkinen | B66B 1/32 187/293 |
| 2013/0127380 | A1* | 5/2013 | Onuma | H02P 3/18 318/375 |
| 2015/0053508 | A1 | 2/2015 | Kattainen et al. | |
| 2016/0280507 | A1 | 9/2016 | Kattainen et al. | |
| 2019/0348930 | A1 | 11/2019 | Paakkinen | |
| 2022/0077808 | A1* | 3/2022 | Wang | H02P 27/06 |
| 2024/0204700 | A1* | 6/2024 | Seo | H02P 29/0241 |

FOREIGN PATENT DOCUMENTS

| | | | |
|---|---|---|---|
| CN | 104364177 | A | 2/2015 |
| CN | 104379479 | A | 2/2015 |
| CN | 104379482 | A | 2/2015 |
| CN | 104787628 | A | 7/2015 |
| CN | 107892244 | A | 4/2018 |
| CN | 108667391 | A | 10/2018 |
| EP | 2855322 | A1 | 4/2015 |
| EP | 2855324 | B1 | 4/2015 |
| EP | 2062348 | B1 | 11/2019 |
| JP | 2002101689 | A | 4/2002 |
| JP | 2013021830 | A | 1/2013 |
| WO | 2008129672 | A1 | 10/2008 |
| WO | 2019227862 | A1 | 12/2019 |
| WO | 2021069895 | A1 | 4/2021 |

* cited by examiner

48
E
MOTOR
46A
U
V
W
46B
46
46A
66
46B
GATE DRIVER
52
44
2ND PWM BUFFER
62
MONITOR
64
LOGIC GATES
60
MONITOR
56
1ST PWM BUFFER
54
SFC_ENABLE_
1ST PWM BUFFER MONITORING
MOTOR SHORT COMMAND
MOTOR SHORT FEEDBACK
CURRENT SENSING FEEDBACK
PX
PX
POWER BOARD
40
50
DSP

ELEVATOR MACHINE BRAKING

BACKGROUND

Elevator systems are in widespread use for carrying passengers between various levels in buildings, for example. Some elevator systems are traction-based in which roping that suspends the elevator car and a counterweight facilitates movement of the elevator car when needed. The roping moves in response to movement of a traction sheave, which is driven by a machine motor or prevented from rotating by a machine brake. In most situations, the machine brake is applied or dropped to stop the elevator car. Alternative or additional ways of braking movement of the elevator car at the machine are needed to comply with some elevator codes, for example.

SUMMARY

An illustrative example embodiment of an elevator drive configured to control power to an elevator motor includes a plurality of first (upper) inverter switches and a plurality of second (lower) inverter switches. A processor is configured to provide control signals to control operation of the inverter switches. A first signal buffer between the processor and the inverter switches is configured to selectively prevent any control signals from turning on any of the inverter switches when the motor should not receive power. A second signal buffer between the processor and the inverter switches is configured to selectively bypass the first signal buffer, prevent any control signals from turning on the first inverter switches, and allow a control signal from the processor to turn on the second inverter switches to provide motor braking.

In addition to one or more of the features described above, or as an alternative, the second signal buffer is in series with the first signal buffer between the first signal buffer and the inverter switches.

In addition to one or more of the features described above, or as an alternative, the elevator drive includes at least one logic module between the first signal buffer and the second signal buffer and wherein the processor provides a motor braking command to the logic module that controls the second signal buffer to bypass the first signal buffer, prevent any control signals from turning on the first inverter switches, and allow a control signal from the processor to turn on the second inverter switches to provide motor braking.

In addition to one or more of the features described above, or as an alternative, the at least one logic module comprises at least one OR gate that allows a control signal to turn on the second inverter switches from the processor or the first signal buffer to reach the second signal buffer.

In addition to one or more of the features described above, or as an alternative, the processor provides a respective first inverter switch control signal for each of the first inverter switches, the processor provides a respective second inverter switch control signal for each of the second inverter switches, the at least one logic module comprises a respective OR gate for each of the second inverter switch control signals, and each OR gate allows a respective second inverter switch control signal to turn on the respective second inverter switch.

In addition to one or more of the features described above, or as an alternative, the at least one logic module comprises software or firmware.

In addition to one or more of the features described above, or as an alternative, the first inverter switches comprise IGBTs and the second inverter switches comprise IGBTs.

In addition to one or more of the features described above, or as an alternative, the elevator drive includes a current sensor associated with each of the second inverter switches, the current sensors providing an indication of current flowing through the second inverter switches.

In addition to one or more of the features described above, or as an alternative, the current sensors each comprise a resistor, a hall effect sensor, or a fluxgate sensor.

In addition to one or more of the features described above, or as an alternative, the elevator drive includes a first monitor that provides an indication of a control signal for each of the first inverter switches and each of the second inverter switches; and a second monitor that provides an indication of a control signal for each of the second inverter switches, wherein the first monitor and the second monitor are between the first signal buffer and the inverter switches.

In addition to one or more of the features described above, or as an alternative, the motor has three phases, the plurality of first inverter switches includes three upper inverter switches, each of the three upper inverter switches is coupled with a respective one of the three phases, the plurality of second inverter switches includes three lower inverter switches, and each of the three lower inverter switches is coupled with a respective one of the three phases.

An illustrative example embodiment includes a method of using an elevator machine to control movement of an associated elevator car. The elevator machine includes a motor configured to selectively move the elevator car and an elevator drive configured to control power supply to the motor. The elevator drive includes a plurality of first inverter switches and a plurality of second inverter switches. The method includes: providing control signals from a processor to control operation of the inverter switches; using a first signal buffer between the processor and the inverter switches for selectively preventing any control signals from turning on any of the inverter switches when the motor should not receive power; and using a second signal buffer between the processor and the inverter switches for selectively bypassing the first signal buffer, preventing any control signals from turning on the first inverter switches, and allowing a control signal from the processor to turn on the second inverter switches to provide motor braking that resists movement of the elevator car.

In addition to one or more of the features described above, or as an alternative, at least one logic module is between the first signal buffer and the second signal buffer; selectively bypassing the first signal buffer comprises providing a motor braking command to the logic module; and the motor braking command controls the second signal buffer to bypass the first signal buffer, prevent any control signals from turning on the first inverter switches, and allow a control signal from the processor to turn on the second inverter switches to provide motor braking.

In addition to one or more of the features described above, or as an alternative, the at least one logic module comprises at least one OR gate that allows a control signal to turn on the second inverter switches from the processor or the first signal buffer to reach the second signal buffer.

In addition to one or more of the features described above, or as an alternative, the processor provides a respective first inverter switch control signal for each of the first inverter switches, the processor provides a respective second inverter switch control signal for each of the second inverter switches, the at least one logic module comprises a respective OR gate for each of the second inverter switch control signals, and each OR gate allows a respective second inverter switch control signal to turn on the respective second inverter switch.

In addition to one or more of the features described above, or as an alternative, the at least one logic module comprises software or firmware.

In addition to one or more of the features described above, or as an alternative, the method includes sensing current flowing through the second inverter switches during the motor braking.

In addition to one or more of the features described above, or as an alternative, the motor has three phases, the plurality of first inverter switches includes three upper inverter switches, each of the three upper inverter switches is coupled with a respective one of the three phases, the plurality of second inverter switches includes three lower inverter switches, and each of the three lower inverter switches is coupled with a respective one of the three phases.

The various features and advantages of an example embodiment will become apparent to those skilled in the art from the following detailed description. The drawings that accompany the detailed description can be briefly described as follows.

DETAILED DESCRIPTION

Figure 1:
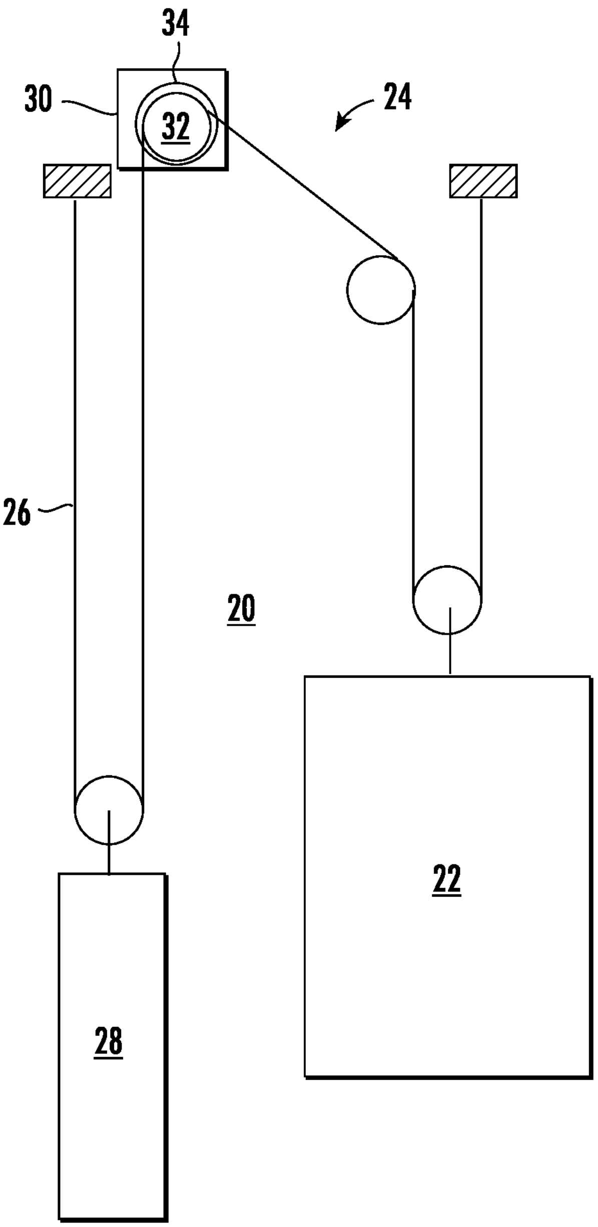
FIG. 1 schematically illustrates selected portions of an elevator system.

FIG. 1 schematically illustrates selected portions of an elevator system 20. An elevator car 22 is supported by a roping arrangement or suspension assembly 24 that includes a plurality of load-bearing suspension members 26. The elevator car 22 is coupled to a counterweight 28 by the suspension members 26. A machine 30 includes a traction sheave 32 for controlling movement of the elevator car. As the suspension members 26 move in response to rotation of the traction sheave 32, the elevator car 22 and counterweight 28 move vertically. A machine brake 34 selectively applies a braking force to prevent the traction sheave 32 from rotating and, thereby, prevents the elevator car 22 from moving.

Figure 2A:
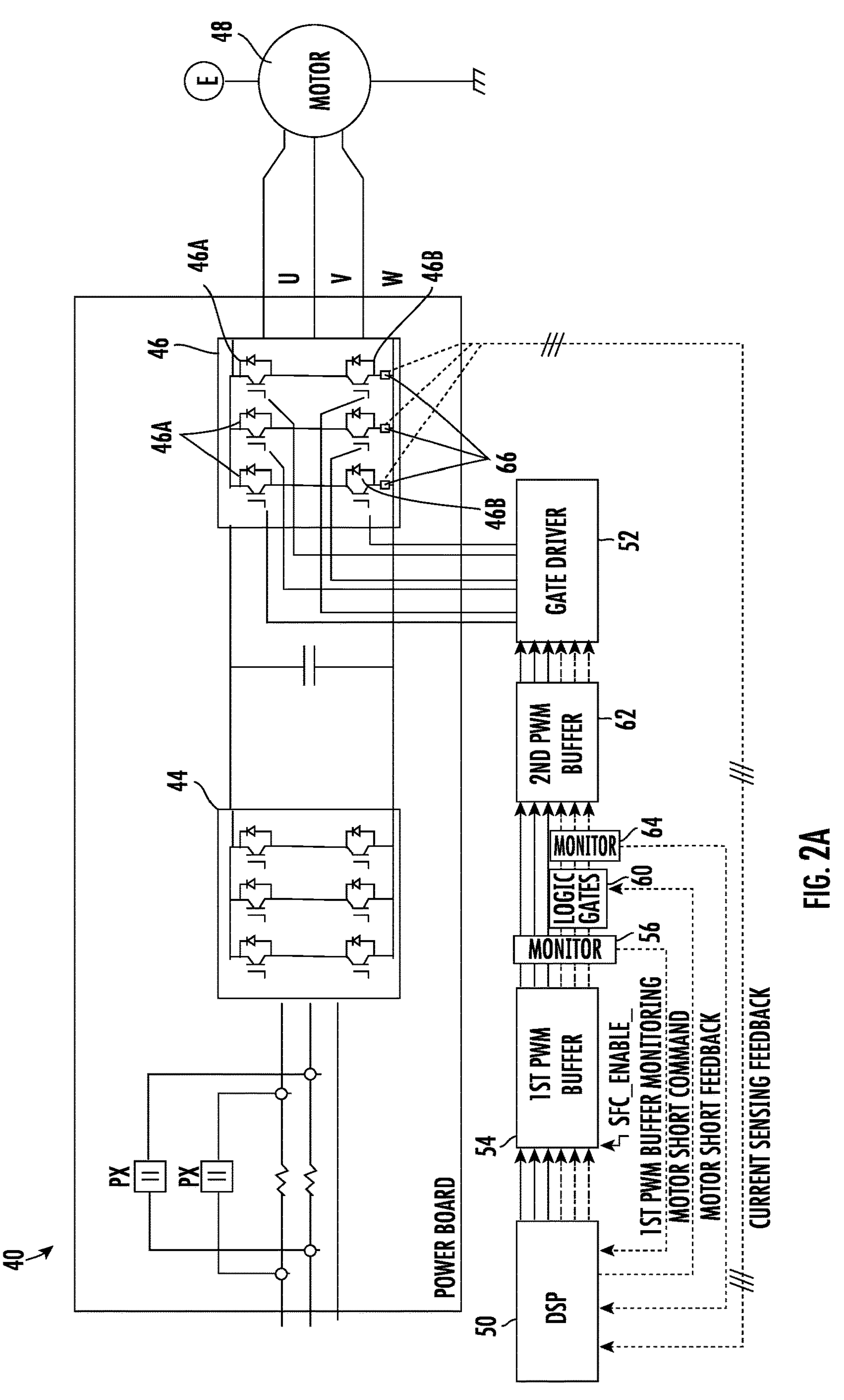
FIG. 2A schematically illustrates an elevator drive configured to provide machine braking according to an example embodiment.

FIG. 2A schematically illustrates selected portions of an example elevator drive 40 that provides machine braking that can be used even when the machine brake 34 is unable to apply a sufficient braking force because, for example, the machine brake 34 is malfunctioning or the load on the elevator car is too large for the machine brake 34 to resist rotation of the traction sheave 32.

The example elevator drive 40 receives power from a power source (not illustrated), such as a utility grid in a known manner. The drive 40 controls known converter switches 44 and inverter switches 46 to provide power to the motor 48 of the elevator machine 30 when needed for moving the elevator car 22. The example embodiment includes a plurality of first inverter switches 46A and a plurality of second inverter switches 46B. The first inverter switches 46A may be referred to as upper inverter switches and the second inverter switches 46B may be referred to as lower inverter switches. In the illustrated example embodiment, the converter switches 44 are IGBTs and the inverter switches 46 are IGBTs.

The elevator drive 40 controls the switches 44 and 46 turn off or disconnect the power from the grid when the elevator car 22 stops. The machine brake 34 drops in the absence of power and applies a braking force to prevent the traction sheave 32 from rotating while the elevator car 22 should remain stationary. If the traction sheave 32 were to rotate under those conditions, the motor 48 rotates with the traction sheave 32 and generates back emf in a known manner.

A processor 50, which is a digital signal processor in this example embodiment, controls operation of the inverter switches 46 through a gate driver 52. A first signal buffer 54 is configured to prevent any signals from reaching the gate driver 52 that would turn on any of the inverter switches 46 while the motor 48 is turned off and the elevator car 22 is stopped. A first monitor 56 provides an indication to the processor 50 regarding any signals passing through the first buffer 54. When the inverter switches 46 are all supposed to be off, for example, the first monitor 56 provides an indication that no ON signals or commands are passing through the first buffer 54 to the gate driver 52. In this example embodiment, since there are three first inverter switches 46A and three second inverter switches 46B, the first buffer 54 provides six distinct indications to the processor 50.

Under circumstances in which motor braking is desired, the processor 50 controls the second inverter switches 46B to short the three phases of the motor 48. The processor 50 issues a motor braking command to activate the second inverter switches 46B to short the motor 48.

The motor braking command bypasses the first buffer 54 and is received by a logic module 60. In some example embodiments, the logic module 60 includes a logic circuit having at least one OR gate that allows signals to pass through the logic module 60 whenever the processor 50 issues a command to activate the second inverter switches 46B through the first buffer 54 or the motor braking command directly to the logic module 60. In some embodiments, the logic module 60 is implemented in software or firmware within the elevator drive 40.

A second buffer 62 is configured to prevent the gate driver 52 from receiving any commands or signals to activate the first inverter switches 46A when power is turned off to the motor 48. The second buffer 62 allows signals or commands for activating the second inverter switches 46B to short the motor 48 when the logic module outputs signals for the second inverter switches 46B in response to the motor braking command from the processor 50.

A second monitor 64 provides an indication to the processor 50 regarding the output of the logic module 60 that allows the processor 50 to determine that the desired commands are reaching the gate driver 52.

When the second inverter switches are properly controlled, the three phases of the motor 48 are short circuited and the back emf associated with any motor rotation under those conditions effectively brakes or resists rotation of the traction sheave 32 to control movement of the elevator car 22. In some examples, such motor braking does not completely stop the elevator car 22 but at least keeps any such movement within a desired, low-speed range below a selected threshold.

Current sensors 66 associated with the second inverter switches 46B provide an indication of current flowing through those switches so the processor 50 can determine whether the elevator drive 40 and the motor 48 are providing the desired power to control movement of the elevator car. During an elevator run, the sensors 66 detect positive and negative polarity currents, which provides an indication that the second inverter switches 46B are working correctly. During motor braking, the current sensors 66 provide confirmation to the processor 50 that the second inverter switches 46B are functioning properly to achieve the desired braking.

Figure 2B:
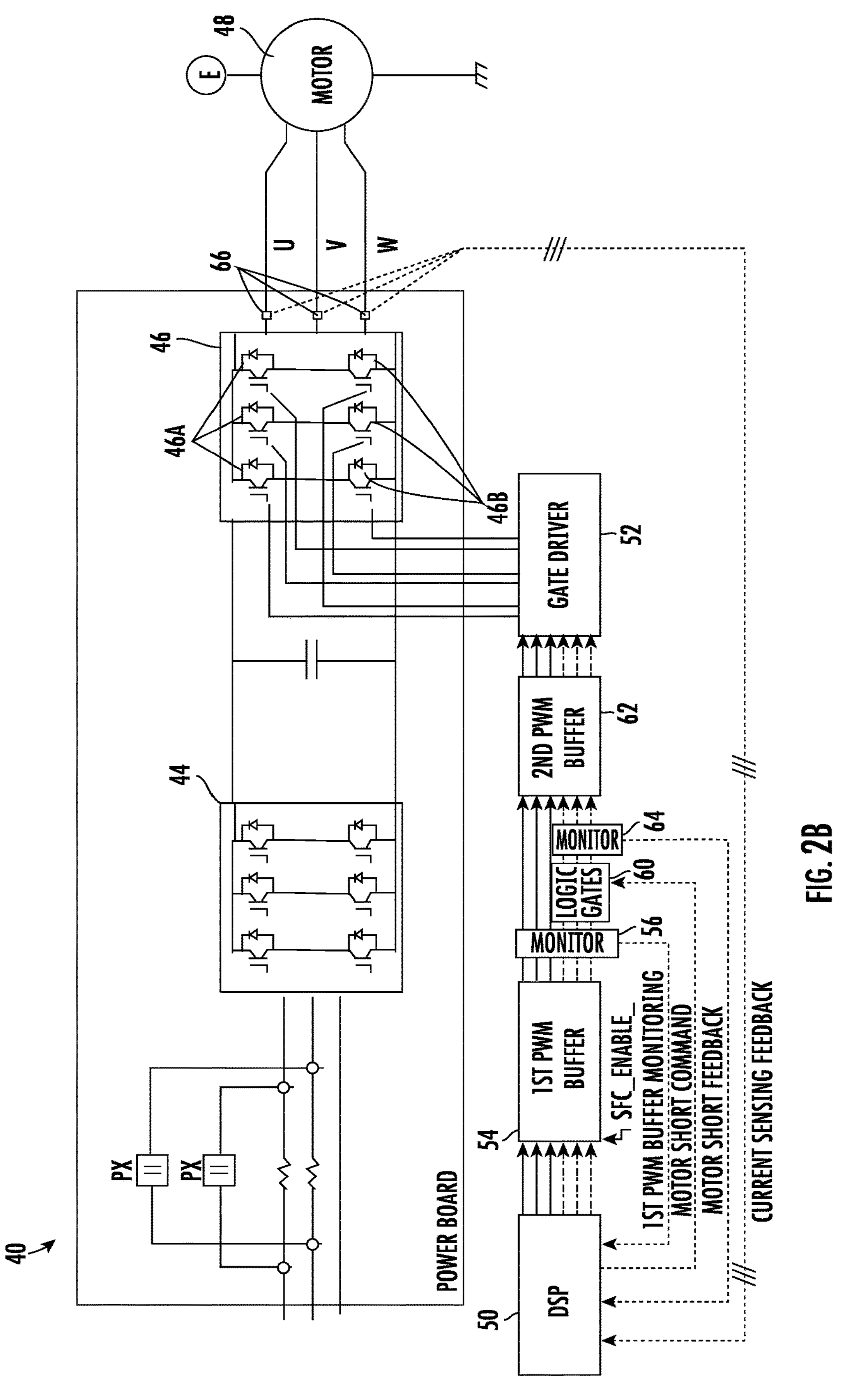
FIG. 2B schematically illustrates another elevator drive configuration.

FIG. 2B shows an embodiment in which the current sensors 66 are situated between the second inverter switches 46B and the motor 48. Otherwise, the embodiment of FIG. 2B is the same as that shown in FIG. 2A.

Figure 3:
FIG. 3 is a flowchart diagram summarizing a braking method according to an example embodiment.
Figure 3:
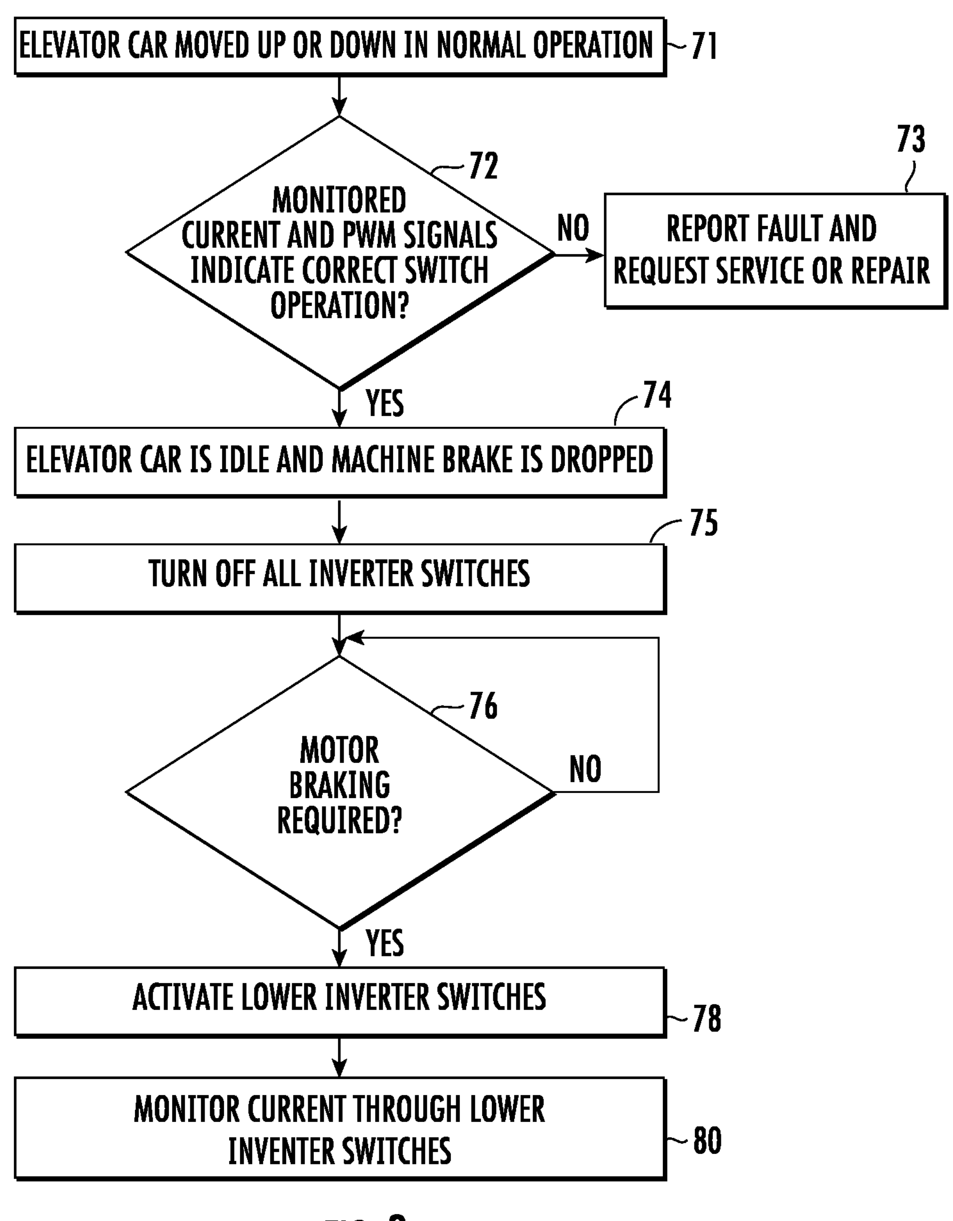

FIG. 3 is a flowchart diagram 70 summarizing an example method of controlling movement of the elevator car 22 using elevator machine braking. The elevator car 22 moves between landings in a designed or normal manner at 71. The processor 50 determines at 72 whether the current monitored by the sensors 66 and the PWM signals monitored by the monitor 56 indicate that the switches 46 are working properly. If the determination at 72 is negative, the processor 50 reports a fault condition and instigates a request for service or repair. If the processor determines that the switches 46 are working properly at 72, the process continues to the condition at 74 in which the elevator car is idle and the machine brake 34 is dropped.

At 75, the processor 50 turns off all of the inverter switches 46. The processor 50 determines whether motor braking is required at 76. When motor braking is needed, at 78, the processor activates or turns on the second (lower) inverter switches 46B. During application of motor braking, at 80, the processor 50 uses the output of the current sensors 66 to monitor the current through the second inverter switches 46B.

The disclosed example embodiment provides braking at the elevator machine 30 to resist or control movement of the elevator car 22. The additional cost to provide that functionality compared to the cost of a known elevator drive is very low. Accordingly, the solution to providing supplemental elevator machine braking provided by embodiments of this invention is very economical. Additionally, relatively simple changes can be made to an existing elevator drive to provide the braking described above.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator drive configured to control power to an elevator motor, the elevator drive comprising:

a plurality of first inverter switches;

a plurality of second inverter switches;

a processor that is configured to provide control signals to control operation of the inverter switches;

a first signal buffer between the processor and the inverter switches, the first signal buffer is configured to selectively prevent any control signals from turning on any of the inverter switches when the motor should not receive power; and a second signal buffer between the processor and the inverter switches, the second signal buffer is configured to selectively bypass the first signal buffer, prevent any control signals from turning on the first inverter switches, and allow a control signal from the processor to turn on the second inverter switches to provide motor braking.

2. The elevator drive of claim 1, wherein the second signal buffer is in series with the first signal buffer between the first signal buffer and the inverter switches.

3. The elevator drive of claim 2, comprising at least one logic module between the first signal buffer and the second signal buffer and wherein the processor provides a motor braking command to the logic module that controls the second signal buffer to bypass the first signal buffer, prevent any control signals from turning on the first inverter switches, and allow a control signal from the processor to turn on the second inverter switches to provide motor braking.

4. The elevator drive of claim 3, wherein the at least one logic module comprises at least one OR gate that allows a control signal to turn on the second inverter switches from the processor or the first signal buffer to reach the second signal buffer.

5. The elevator drive of claim 3, wherein the processor provides a respective first inverter switch control signal for each of the first inverter switches, the processor provides a respective second inverter switch control signal for each of the second inverter switches, the at least one logic module comprises a respective OR gate for each of the second inverter switch control signals, and each OR gate allows a respective second inverter switch control signal to turn on the respective second inverter switch.

6. The elevator drive of claim 3, wherein the at least one logic module comprises software or firmware.

7. The elevator drive of claim 1, wherein the first inverter switches comprise IGBTs and the second inverter switches comprise IGBTs.

8. The elevator drive of claim 1, comprising a current sensor associated with each of the second inverter switches, the current sensors providing an indication of current flowing through the second inverter switches.

9. The elevator drive of claim 8, wherein the current sensors each comprise a resistor, a hall effect sensor, or a fluxgate sensor.

10. The elevator drive of claim 1, comprising a first monitor that provides an indication of a control signal for each of the first inverter switches and each of the second inverter switches; and a second monitor that provides an indication of a control signal for each of the second inverter switches, wherein the first monitor and the second monitor are between the first signal buffer and the inverter switches.

11. The elevator drive of claim 1, wherein the motor has three phases, the plurality of first inverter switches includes three upper inverter switches, each of the three upper inverter switches is coupled with a respective one of the three phases, the plurality of second inverter switches includes three lower inverter switches, and each of the three lower inverter switches is coupled with a respective one of the three phases.

12. The elevator drive of claim 1, including a gate driver between the second signal buffer and the plurality of first inverter switches and the plurality of second inverter switches, wherein the first signal buffer is configured to selectively prevent any control signals from reaching the gate driver to turn on any of the plurality of first inverter switches and the plurality of second inverter switches when the elevator motor should not receive power.

13. The elevator drive of claim 1, wherein the motor braking provided by the plurality of second inverter switches keeps movement of an associated elevator car within a low-speed range below a selected threshold.

14. The elevator drive of claim 1, wherein the motor braking provided by the plurality of second inverter switches is configured to resist movement of an associated elevator car when a machine brake associated with the elevator machine is unable to apply sufficient braking force.

15. A method of using an elevator machine to control movement of an associated elevator car, the elevator machine including a motor configured to selectively move the elevator car and an elevator drive configured to control power supply to the motor, the elevator drive including a plurality of first inverter switches and a plurality of second inverter switches, the method comprising:

providing control signals from a processor to control operation of the inverter switches;

using a first signal buffer between the processor and the inverter switches for selectively preventing any control signals from turning on any of the inverter switches when the motor should not receive power; and using a second signal buffer between the processor and the inverter switches for selectively bypassing the first signal buffer, preventing any control signals from turning on the first inverter switches, and allowing a control signal from the processor to turn on the second inverter switches to provide motor braking that resists movement of the elevator car.

16. The method of claim 15, wherein at least one logic module is between the first signal buffer and the second signal buffer;

selectively bypassing the first signal buffer comprises providing a motor braking command to the logic module; and the motor braking command controls the second signal buffer to bypass the first signal buffer, prevent any control signals from turning on the first inverter switches, and allow a control signal from the processor to turn on the second inverter switches to provide motor braking.

17. The method of claim 16, wherein the at least one logic module comprises at least one OR gate that allows a control signal to turn on the second inverter switches from the processor or the first signal buffer to reach the second signal buffer.

18. The method of claim 16, wherein the processor provides a respective first inverter switch control signal for each of the first inverter switches, the processor provides a respective second inverter switch control signal for each of the second inverter switches, the at least one logic module comprises a respective OR gate for each of the second inverter switch control signals, and each OR gate allows a respective second inverter switch control signal to turn on the respective second inverter switch.

19. The method of claim 16, wherein the at least one logic module comprises software or firmware.

20. The method of claim 15, comprising sensing current flowing through the second inverter switches during the motor braking.

21. The method of claim 15, wherein the motor has three phases, the plurality of first inverter switches includes three upper inverter switches, each of the three upper inverter switches is coupled with a respective one of the three phases, the plurality of second inverter switches includes three lower inverter switches, and each of the three lower inverter switches is coupled with a respective one of the three phases.

22. The method of claim 15, further including driving the plurality of first inverter switches and the plurality of second inverter switches through a gate driver, wherein the first signal buffer selectively prevents control signals from reaching the gate driver when the elevator motor should not receive power.

23. The method of claim 15, wherein the motor braking keeps movement of the elevator car within a low-speed range below a selected threshold instead of completely stopping the elevator car.

24. The method of claim 15, wherein using the second signal buffer to allow the control signal to turn on the plurality of second inverter switches to provide motor braking comprises providing motor braking when a machine brake of the elevator machine is unable to apply sufficient braking force to prevent movement of the elevator car.

* * * * *